United States Patent [19]

Braschel

[11] Patent Number: 4,485,445
[45] Date of Patent: Nov. 27, 1984

[54] METHOD OF BRAKING A VEHICLE HAVING A WHEEL ANTI BRAKE-LOCK OR ANTI-SKID SYSTEM

[75] Inventor: Volker Braschel, Heilbronn, Fed. Rep. of Germany

[73] Assignee: Robert Bosch GmbH, Stuttgart, Fed. Rep. of Germany

[21] Appl. No.: 427,184

[22] Filed: Sep. 29, 1982

[30] Foreign Application Priority Data

Jan. 22, 1982 [DE] Fed. Rep. of Germany ....... 3201929

[51] Int. Cl.$^3$ ............................................. B60T 8/08
[52] U.S. Cl. ..................................... 364/426; 303/95; 303/96
[58] Field of Search .................. 364/426, 565; 303/95, 303/100, 96, 20, 111

[56] References Cited

U.S. PATENT DOCUMENTS 3,863,993 6/1975 Fleischer et al. .
3,930,688 1/1976 Ran et al. ........................ 364/426 X

FOREIGN PATENT DOCUMENTS 2555005 6/1977 Fed. Rep. of Germany .

Primary Examiner—J. V. Truhe
Assistant Examiner—Saul M. Bergmann
Attorney, Agent, or Firm—Frishauf, Holtz, Goodman & Woodward

[57] ABSTRACT

To provide for close adaptation of braking performance by braking pressure maintenance, braking pressure dropping, or braking pressure increase to match wheel acceleration or deceleration, and operating constants within the overall braking system, the wheel anti brake-lock responds when wheel deceleration drops below a predetermined reference threshold. Wheel speed is sensed in steps, for example in intervals of 0.25 km/h, and the steps are counted. A predetermined brake pressure decrease time ($t_{min}$) is initiated when wheel speed drops below the reference wheel speed, the total time ($t_a$) of pressure decrease being the minimum time plus a number of first control time intervals ($\Delta_1 t$) which depend on the number of speed steps being passed by the wheel as it decelerates. If the wheel speed, after the pressure decrease, does not decelerate at the same rate anymore, a pressure maintenance phase is commanded for a maximum time ($\Delta_2 t$) which, however, is foreshortened by second control timing intervals ($\Delta_2 t$) in dependence on the wheel passing further speed steps or stages. If the wheel should decelerate substantially ($\lambda_2$) or drop below a deceleration threshold ($-b$), a further pressure decrease phase can be immediately initiated, overriding the pressure maintenance phase. The first and second control timing intervals can also be made dependent on each other.

7 Claims, 2 Drawing Figures

METHOD OF BRAKING A VEHICLE HAVING A WHEEL ANTI BRAKE-LOCK OR ANTI-SKID SYSTEM

Reference to related patent, assigned to the assignee of the present invention, the disclosure of which is hereby incorporated by reference: U.S. Pat. No. 3,863,993, FLEISCHER.

Reference to related publication: Bosch Technological Reports, Vol. 7, 1980, No. 2, English special edition (February 1982), ISSN 0006-789 X, "Antiskid System (ABS) for Passenger Cars", article by Heinz Leiber, Armin Czinczel and Jürgen Anlauf.

German Patent Disclosure Document DE-OS No. 25 55 005, LEIBER et al.

U.S. Pat. No. 3,972,568.

U.S. patent application Ser. Nos. 268,507, now U.S. Pat. No. 4,357,054, Nov. 2, 1982 Leiber; 200,632 now U.S. Pat. No. 4,374,421, Feb. 15, 1983, Leiber.

The present invention relates to anti brake-lock systems, and more particularly to such systems for use in passenger cars in which the timing of dropping of braking pressure is controlled.

BACKGROUND

Vehicles, and particularly automotive vehicles which have anti-brake lock or anti-skid systems usually include hydraulic or other pressure fluid operated brakes in which, in dependence on operating conditions and braking conditions of the vehicle, braking pressure is controlled as a function of wheel acceleration or deceleration. Customarily, braking pressure can be dropped, maintained constant, or increased by suitable control of valves which drain pressurized braking fluid, block transmission and drainage of pressurized braking fluid, or permit application of pressurized braking fluid to the brakes. In accordance with known systems, braking pressure is first increased and, as slippage or excessive deceleration of a wheel with respect to a road surface is sensed, the braking pressure is then not increased but maintained at a constant level. If the slippage increases, that is, if the wheel continues to decelerate in accordance with a predetermined deceleration function, braking pressure is dropped or decreased. Decrease of braking pressure is usually continued if a predetermined deceleration threshold of the wheel is exceeded. The phase of braking pressure is continued until another predetermined deceleration threshold is passed, that is, until the wheel which has been controlled has a tendency to accelerate again.

Due to inertia effects within the system, and filters necessary to suppress disturbance and noise signals, accurate control in accordance with theoretically most desirable conditions is difficult. Particularly, it is difficult to determine the precise instant of time at which the braking pressure decrease should be terminated. Dead times and delay times which arise within the system thus may interfere with theoretically determined operation, and it may happen that the decrease in braking pressure is terminated too late.

It has been proposed to control the time during which braking pressure can be decreased, and to stop decrease of braking pressure after the elapse of a predetermined timing interval. It has also been proposed to permit braking pressure to become effective only if a further, and substantially higher, deceleration threshold is exceeded.

Decrease of braking pressure can be controlled by a retriggerable timing element—see, for example, the referenced German Patent Disclosure Document DE-OS No. 25 55 005 describing decreasing vehicle speed, in steps. The system is so arranged that a timing element is activated each time one of a predetermined speed intervals is passed, so that, overall, the time duration of pressure decrease will depend on the number of the speed intervals which have been passed during the deceleration of the wheel.

It has been found that such an arrangement does not provide for optimum adaptive control operation, since the overall duration of the control phase may become too long, because the pressure decrease phase of the control cycle may become excessively long. It is necessary to dimension the timing element with a sufficiently long timing constant, so that, if the timing element is only triggered once, a sufficient time to permit decrease of braking pressure will be available. This, initially comparatively long time, however, may be disadvantageous if, after the last speed interval has been passed, the remaining time interval of the element still has to elapse before a different braking pressure mode can result. Thus, the time delay of the timing element may become excessively long with respect to that which is actually desired.

THE INVENTION

It is an object to improve the operation of an anti-skid or anti brake-lock system by closely matching the operating cycle involving pressure decrease phases to actual operating conditions of a wheel.

Briefly, and utilizing a wheel anti brake lock system as well known and commercially used, for example as described in the referenced literature, or U.S. Pat. No. 3,863,993. A predetermined minimum timing interval $t_{min}$ is set which is defined as the minimum time for the duration of decrease of braking pressure. In accordance with the method of the invention, the pressure decrease will occur at least during said minimum time if a certain speed threshold is passed. A plurality of control timing intervals $\Delta_{1t}$ are defined, and that number of the first control timing intervals is selected or used which depends on the number of steps or speed intervals passed by the wheel as it decelerates. Thus, the total braking pressure decrease time $t_a$ will be the fixed or minimum time $t_{min}$ plus the number of first control timing intervals $\Delta_{1t}$. A subsequent brake pressure maintenance phase of the control cycle is then commanded, which will extend for a predetermined maximum time $t_{max}$ less, however, a plurality of second control timing intervals $\Delta_{2t}$, the number of the second control timing intervals depending on the number of steps or speed intervals which were counted after the beginning of the maximum time interval.

In accordance with a feature of the invention, the first and second control timing intervals $\Delta_{1t}$ and $\Delta_{2t}$ can be the same; they need not be the same, however; they may be different.

The system can be further modified by sensing if, after the first pressure decrease has terminated, a second pressure decrease can be commanded if a second and higher slipping threshold, that is, substantial deceleration of the wheel, is sensed, even though the time during which the pressure maintenance phase should occur has not yet elapsed.

The system has the advantage that the timing of the pressure dropping or decreasing phase can be individually controlled based on vehicle speed or change of vehicle speed or passage of vehicle speed through a number of speed change thresholds; further, the duration of a subsequent braking pressure maintenance phase can be suitably controlled, so that the overall behavior of deceleration of the wheel will adapt to the actual slippage or skidding conditions. This substantially improves the adaptive behavior of the overall control system, since an increase in the pressure dropping or decrease time is compensated by a decrease to appropriately dimension the minimum timing intervals by presetting an initial minimum pressure dropping time which is appropriately dimensioned in the view of overall system delays, while extending this time, in dependence on actual operating conditions experienced by the wheel. Thus, an extremely fine and accurate adaptation of the system to actual road conditions will be possible. If the wheel, after slipping, should meet a gripping surface, it will rapidly react to permit application of braking pressure, since termination of decrease of braking pressure will be rapid and prompt, without having to allow for extended time intervals necessary for the very first brake pressure reduction time interval.

DRAWINGS

FIG. 1 is a schematic diagram of wheel speed and braking pressure relationships; and FIG. 2 illustrates these relationships in more detailed form and also illustrates another possible modification. In the figures, the wheel speed $v_R$ and the braking pressure p are represented at the ordinate, the abscissa being time.

DETAILED DESCRIPTION

Figure 1:
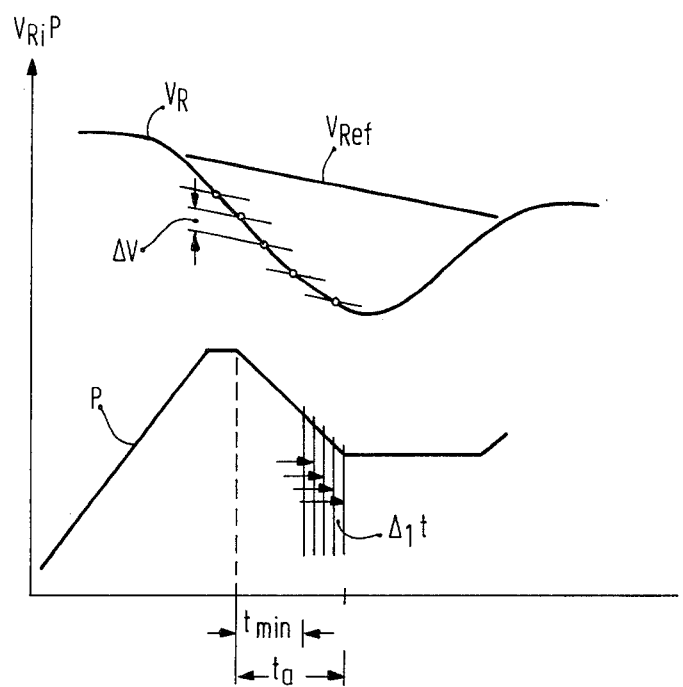

Let it be assumed that braking pressure is applied to the braking system of a wheel. Upon starting of the braking cycle, braking pressure p at first will increase. Consequently, wheel speed $v_R$ will decrease—see FIG. 1. Let it be assumed that the wheel operates on a slippery surface and skids. The wheel speed $v_R$ will drop below that of a predetermined reference wheel speed decrease $v_{Ref}$. Upon sensing a difference between the decreasing wheel speed $v_R$ and the reference wheel speed $v_{Ref}$, a pressure decrease cycle, that is, response of the wheel anti-lock or anti-skid system will begin. The wheel speed $v_R$ is, thereupon, supervised or monitored if predetermined speed intervals $\Delta v$ of, for example 0.25 km/h are passed. The time duration of a pressure decrease cycle will be determined by a predetermined minimum time $t_{min}$, see FIG. 1. In accordance with the present invention, further, the number of speed steps $\Delta v$ exceeded by the wheel is counted. In the example of FIG. 1, four such speed steps are passed by the wheel. In accordance with a feature of the invention, the minimum or first timing interval $t_{min}$ is extended by first control time intervals $\Delta_{1t}$ to form an overall brake pressure decrease time $t_a$. In the example of FIG. 1, four speed steps $\Delta v$ are exceeded, and hence the minimum pressure drop time $t_{min}$ is extended by four first control timing intervals $\Delta_{1t}$ to the overall time $t_a$ during which braking pressure is dropped.

When the last control timing interval $\Delta_{1t}$ has elapsed, a pressure maintenance phase of the control cycle will start. This is shown in FIG. 1.

Figure 2:
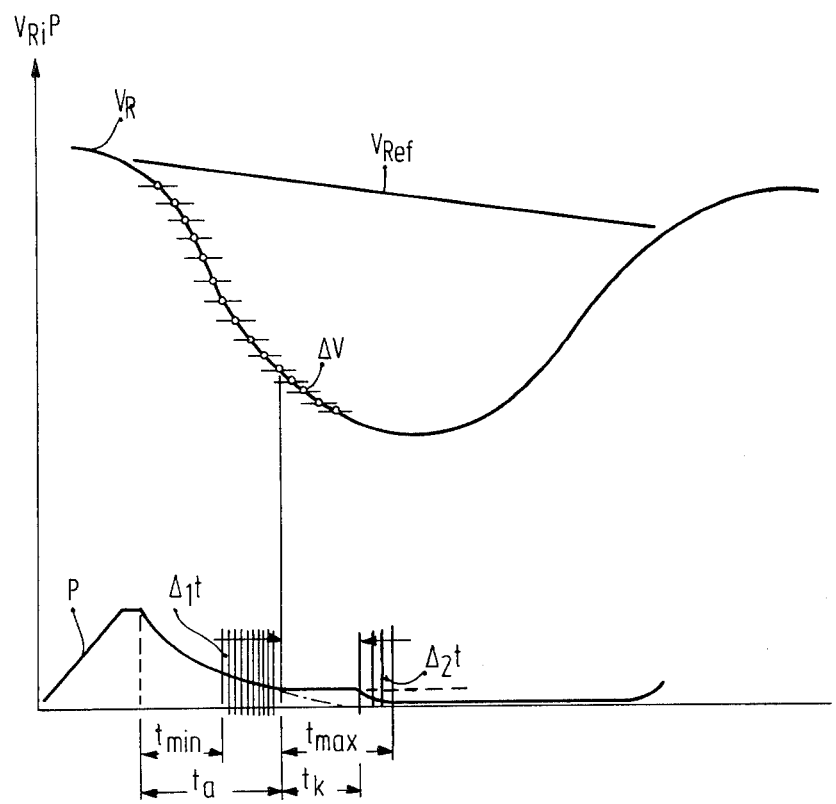

In accordance with a feature of the invention—see FIG. 2—the pressure maintenance phase will be a predetermined maximum time duration $t_{max}$ minus, or less, a predetermined number of second control timing intervals $\Delta_{2t}$. The second timing intervals $\Delta_{2t}$ are predetermined time intervals provided or set into the anti brake-lock system. The second timing intervals may, but need not, be the same as the first timing intervals $\Delta_{1t}$. In the example selected—see FIG. 2—the maximum time $t_{max}$ is decreased by three second control timing intervals $\Delta_{2t}$, which corresponds to the number of speed timing intervals passed by the wheel during the pressure maintenance phase. The overall time of pressure maintenance, then, will be $t_k$, mathematically the maximum time $t_{max}$ minus three second control time intervals $\Delta_{2t}$.

Of course, the number of the first timing intervals $\Delta_{1t}$ and the number of the second timing intervals $\Delta_{2t}$ need not be the same, nor need they directly correspond to the number of the respective speed time intervals $\Delta v$. Other relationships may be used. It is, of course, also possible to utilize a proportional or a non-linear dependence between the speed intervals $\Delta v$ and the respective control timing intervals $\Delta_{1t}$, $\Delta_{2t}$.

In an operative embodiment for a passenger motor vehicle, the speed intervals $\Delta_v$ were selected for 0.25 km/h, and the timing intervals $\Delta_{1t}$ and $\Delta_{2t}$, each, 0.5 milliseconds.

At particularly low frictional characteristics of the roadway, that is, at particularly slippery surfaces, for example under icing conditions, the situation may occur that at the end of the pressure decreasing phase, that is, at the termination of the time $t_a$, the braking pressure p still will be too high. In accordance with a feature of the invention, a second and higher slipping or deceleration threshold $\lambda_2$ is set or defined which, if the deceleration threshold thereof is passed, determines if this slipping threshold has been exceeded. Should that be the case, then the brake pressure maintenance phase is overridden by a further pressure dropping phase, as illustrated in chain-dotted lines in FIG. 2.

Dropping of braking pressure, as is clearly apparent from FIG. 2, occurs, during the brake pressure dropping phase, at a slower rate, as the pressure within the wheel brake cylinder decreases. The braking pressure which will be available at the termination of the dropping phase must be sufficient to permit re-acceleration of the wheel. The case may, however, occur that the braking pressure which is available at the termination of the pressure maintenance phase is still too high, and does not permit re-acceleration of the wheel, so that it is necessary to provide for a further brake pressure decrease upon termination of the pressure maintenance phase. This mode is shown in the full-line curve of FIG. 2. If, however, the wheel should not decelerate any more after elapse of the first braking pressure decrease phase—see FIG. 1—there will be no second control timing intervals $\Delta_{2t}$ counted, so that the maximum pressure maintenance phase can obtain, as shown in broken lines in FIG. 2. In general, after termination of the time $t_k$, foreshortened as shown in FIG. 2 or corresponding to the time $t_{max}$, the deceleration sensing threshold stages, present in the anti-skid system will test if the wheel deceleration thresholds are being exceeded or not. A road surface with better or increased friction will permit the wheel to re-accelerate; if a further wheel deceleration threshold is exceeded, however, the frictional coefficient of the road continues at a very slippery state, since the wheel will not be sufficiently re-accelerated.

Rather than sensing a wheel deceleration threshold, it is also, of course, possible to provide a wheel re-acceleration threshold stage which, unless it responds, provides an output signal indicative of failure to re-accelerate. Thus, low frictional conditions of the roadway will be recognized and, if so, the braking pressure will be decreased, in steps, until a re-acceleration of the wheel is sensed. If the extent of wheel deceleration exceeds the higher threshold $\lambda_2$, then the brake maintenance phase $t_k$ may be overridden, or extended to occur at a much later time instant—see FIG. 2.

The time for brake pressure decrease or brake pressure maintenance, thus, can be made dependent on wheel deceleration. At high deceleration rates, it is necessary to rapidly decrease the braking pressure, and hence the brake pressure decrease time $t_a$ is high, whereas the pressure maintenance phase is of short duration. This system, in contrast to utilizing only fixed time intervals, has the advantage that during the first wheel braking deceleration phase, the wheel deceleration will have an integrating behavior of wheel deceleration with respect to brake pressure decrease time. Thus, for short decreases of wheel deceleration, the pressure decrease control system will be effective, but not for longer than necessary; whereas for extensive wheel deceleration conditions, the appropriate decrease in brake pressure will be controlled.

The structural components of the system may be in accordance with the patent incorporated by reference and, of course, in accordance with well known technology as illustrated, for example, by the literature and other references.

Various changes and modifications may be made within the scope of the inventive concept.

Of course, wheel deceleration thresholds ($-b$), for example preset, and wheel acceleration thresholds ($+b$), also preset, can be established, as well known; and the respective pressure decrease phases or a pressure increase phase can be initiated upon, respectively, sensing further wheel deceleration or wheel acceleration so that the actual braking effect will adapt itself to actual wheel operating and road surface conditions. The number of first and second control timing intervals $\Delta_{1t}$ and $\Delta_{2t}$ can be made dependent on each other, so that the decrease in the pressure maintenance phase effected by the second control timing intervals will, entirely or to some extent, balance the increase in time of the pressure dropping phase.

I claim:

1. Method of braking a vehicle having a wheel anti brake-lock or anti-skid system in which, upon sensing of a tendency of a wheel to slip upon application of brake pressure, by sensing deceleration ($v_R$) of the wheel at a rate below a predetermined reference rate ($v_{Ref}$), the brake pressure is decreased, including the steps of
    sensing wheel deceleration, in speed steps, or speed intervals ($\Delta v$);
    counting the number of speed intervals or steps ($\Delta v$) which are passed upon wheel deceleration;
    controlling the duration of decrease of braking pressure as a function of said counted number of speed intervals ($\Delta v$),
    and further comprising, in accordance with the invention, the steps of
    defining a predetermined minimum time ($t_{min}$) for the duration of decrease of braking pressure after the wheel speed ($v_R$) drops below the reference speed ($v_{Ref}$) by a predetermined amount, for the duration of decrease of braking pressure, and decreasing braking pressure during said predetermined minimum time;
    defining a plurality of first control time intervals ($\Delta_{1t}$);
    and selecting a predetermined number of said first control timing intervals in dependence on the number of steps or speed intervals ($\Delta v$) which were sensed to provide a total braking pressure decrease time ($t_a$) which is the sum of said predetermined minimum time ($t_{min}$) and said number of first control timing intervals ($\Delta_{1t}$) based on the number of steps, or speed intervals which were sensed.

2. Method according to claim 1, further including the step of
    commanding a braking pressure maintenance phase after said pressure decrease;
    defining a predetermined maximum time ($t_{max}$) for the step of braking pressure maintenance;
    defining a plurality of second control timing intervals ($\Delta_{2t}$);
    and reducing the predetermined maximum time ($t_{max}$) by a controlled number of second control timing intervals ($\Delta_{2t}$) as a function of the number of steps or speed intervals ($\Delta v$) counted after beginning of said maximum time, to provide a total braking pressure maintenance time ($t_k$) which is the difference of said predetermined maximum time ($t_{max}$) and said number of second control timing intervals ($\Delta_{2t}$) based on the steps or speed intervals ($\Delta_v$) counted after beginning of the maximum timing interval ($t_{max}$).

3. Method according to claim 2, wherein said first and second timing intervals are the same.

4. Method according to claim 1, including the step of sensing a predetermined deceleration rate ($\lambda_2$);
    and decreasing braking pressure after termination of the total pressure decrease time ($t_a$) to initiate a further pressure decrease phase if said wheel deceleration rate ($\lambda_2$) has been exceeded.

5. Method according to claim 2, including the step of sensing a predetermined wheel deceleration rate ($\lambda_2$);
    and decreasing braking pressure even during the course of said predetermined maximum time, by overriding the pressure maintenance phase to initiate a further pressure decrease phase if the sensed wheel deceleration rate has exceeded said predetermined deceleration rate ($\lambda_2$).

6. Method according to claim 2, including the step of sensing a first predetermined wheel deceleration rate ($\lambda_1$);
    sensing a second predetermined wheel deceleration rate ($\lambda_2$) higher than said first predetermined wheel deceleration rate;
    sensing a preset wheel deceleration threshold ($-b$);
    and further comprising the step of initiating a further pressure decrease phase for said predetermined minimum time ($t_{min}$) and said first control timing intervals ($\Delta_{1t}$) if said first predetermined wheel deceleration rate ($\lambda_1$) or said preset wheel deceleration threshold ($-b$) is still exceeded after the overall brake maintenance time ($t_k$) has terminated.

7. Method according to claim 1, including the step of sensing a preset wheel acceleration threshold ($+b$);
    and comprising the step of terminating decrease of braking pressure if the actual wheel acceleration exceeds said acceleration threshold ($+b$).

* * * * *